(12) United States Patent
Chenault

(10) Patent No.: US 8,417,572 B1
(45) Date of Patent: Apr. 9, 2013

(54) EXPECTED EXHAUSTION TIME

(75) Inventor: John Chenault, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 2020 days.

(21) Appl. No.: 10/406,626

(22) Filed: Apr. 3, 2003

(51) Int. Cl.
*G06G 1/14* (2006.01)
*G06Q 10/00* (2006.01)
*G06F 19/00* (2006.01)

(52) U.S. Cl.
USPC ............................... 705/22; 705/28; 235/385

(58) Field of Classification Search .................... 705/22, 705/28
See application file for complete search history.

(56) References Cited

U.S. PATENT DOCUMENTS

| | | | |
|---|---|---|---|
| 5,727,164 A | 3/1998 | Kaye | |
| 5,940,807 A | 8/1999 | Purcell | |
| 6,006,196 A * | 12/1999 | Feigin et al. | 705/10 |
| 6,023,683 A | 2/2000 | Johnson et al. | |
| 6,081,789 A | 6/2000 | Purcell | |
| 6,219,653 B1 * | 4/2001 | O'Neill et al. | 705/400 |
| 6,272,472 B1 | 8/2001 | Danneels | |
| 6,324,522 B2 | 11/2001 | Peterson et al. | |
| 6,341,271 B1 | 1/2002 | Salvo | |
| 6,418,416 B1 | 7/2002 | Rosenberg et al. | |
| 6,654,726 B1 | 11/2003 | Hanzek | |
| 7,072,843 B2 * | 7/2006 | Menninger et al. | 705/8 |
| 7,222,786 B2 * | 5/2007 | Renz et al. | 235/385 |
| 2001/0047285 A1 | 11/2001 | Borders et al. | |
| 2002/0010659 A1 | 1/2002 | Cruse et al. | |
| 2002/0042756 A1 | 4/2002 | Kumar et al. | |
| 2002/0069115 A1 | 6/2002 | Fitzpatrick | |
| 2002/0095307 A1 | 7/2002 | Greamo et al. | |
| 2002/0107763 A1 | 8/2002 | Palmer | |
| 2002/0111880 A1 | 8/2002 | Stutts | |
| 2002/0147651 A1 | 10/2002 | Hoar | |
| 2002/0147657 A1 | 10/2002 | Callender | |
| 2002/0165782 A1 | 11/2002 | Falkenstein et al. | |
| 2002/0178074 A1 | 11/2002 | Bloom | |
| 2002/0188499 A1 | 12/2002 | Jenkins | |
| 2002/0188516 A1 | 12/2002 | Farrow | |
| 2005/0075949 A1 * | 4/2005 | Uhrig et al. | 705/28 |

OTHER PUBLICATIONS

White, Ron, "How Computers Work," Millennium Ed. Que Corporation, Sep. 1999.
Derfler, Frank J. et al., "How Networks Work," Millenium Ed. Que Corporation, Jan. 2000.
Gralla, Preston, "How the Internet Works," Millennium Ed., Que Corporation, Aug. 1999.

* cited by examiner

*Primary Examiner* — Fahd Obeid
(74) *Attorney, Agent, or Firm* — Robert C. Kowert; Meyertons, Hood, Kivlin, Kowert & Goetzel, P.C.

(57) ABSTRACT

A facility for analyzing ordering trends for an item is described. Based upon an historical ordering activity for the item, the facility projects future ordering activity for the item. The facility compares the future ordering activity projected for the item to inventory in the item. Based upon this comparison, the facility determines when future ordering activity is expected to exhaust inventory in the item.

16 Claims, 7 Drawing Sheets

EXPECTED EXHAUSTION TIME

CROSS REFERENCE TO RELATED APPLICATIONS

This application is related to U.S. application Ser. No. 10/012,205 and U.S. application Ser. No. 09/921,011, both of which are hereby incorporated by reference in their entirety.

FIELD

The present invention is directed to the field of electronic commerce.

BACKGROUND

The World Wide Web ("the Web") is a system for publishing information, in which users may use a web browser application to retrieve information, such as web pages, from web servers and display it.

The Web has increasingly become a medium used to shop for products.

Indeed, thousands and thousands of different products—as well as other items such as service contracts—may be purchased on the Web. A user who plans to purchase an item on the Web can visit the Website of a Web merchant that sells the item, view information about the item, give an instruction to purchase the item, and provide information needed to complete the purchase, such as payment and shipping information.

It is typical for a user to view information about a product on an "item detail page." The information provided on an item detail page may include such information as the item's name and source, a picture of the item, a description of the item, reviews or ratings of the item, a price at which the item is offered for sale, and a control—such as a button—that may be activated by the user to order the item from the web merchant.

In some senses, shopping at a web merchant is significantly more compelling than shopping at a physical merchant. For example, a user that shops at a web merchant can complete a shopping task without the extra inconvenience, time cost, and pecuniary cost associated with visiting a physical merchant in person. Also, a user may shop at two or more web merchants simultaneously, permitting him or her to simultaneously gather information about the product from several sources.

Although shopping at a web merchant has several distinct advantages such as those discussed above, shopping at conventional web merchants shares certain disadvantages with shopping at physical merchants. One such disadvantage is that it is often difficult for a customer considering purchasing an item from either kind of merchant to understand how long the item will be available for ordering from the merchant. Sometimes an items that has been available for purchase from a particular physical merchant or web merchant becomes unavailable. In many cases, this is because the merchant has exhausted its inventory in the item, and is unable to replenish its inventory. Such inability to replenish inventory in an item may be temporary, e.g., the manufacturer or supplier from which the merchant obtains the item may have exhausted its inventory, or permanent, e.g., the item's manufacturer may have ended manufacture of the item. Where a customer sees that an item is available for purchase from a particular merchant, decides to purchase the item from that merchant later, and then discovers that the item is no longer available for purchase from the merchant, the customer is disappointed, and must purchase the item from another source. In some cases, the merchant's inability to replenish is shared by some or all other sources of the item, making it difficult or impossible for the customer to purchase the item anywhere.

Accordingly, a facility for providing information about a future time at which a merchant's inventory in an item is expected to be exhausted would have significant utility.

DETAILED DESCRIPTION

Figure 1:
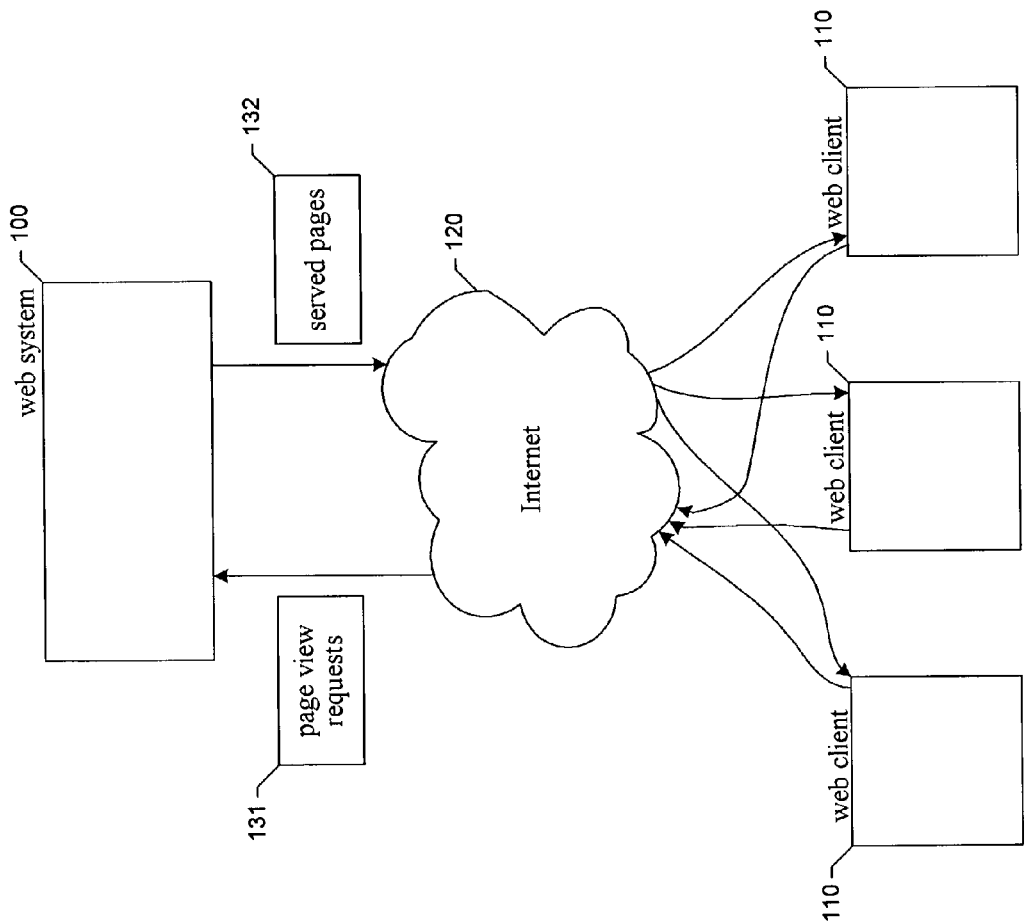
FIG. 1 is a high-level data flow diagram showing data flow within a typical arrangement of components used to provide front-end functionality of the facility.

A software facility for providing information about a future time at which a merchant's inventory in an item is expected to be exhausted ("the facility") is described. In some embodiments, the facility provides the information to customers of a web merchant by causing it to be included on an item detail page for the item—or other web page containing information about the item—accessible to customers of the web merchant. By doing so, the facility provides a greater level of useful information to customers of the merchant, which may inspire in those customers a greater sense of loyalty to the merchant, and enables customers who wish to purchase the item to place their orders for the item in the time that remains before inventory in the item is exhausted. From the merchant's perspective, the facility provides an impetus for customers to make purchases that they would not otherwise be able to make, thereby boosting revenue, and/or accelerates purchases that would otherwise be made at a later time, thereby accelerating revenue. Accordingly, the facility provides significant utility to the merchant, and to the merchant's customers.

Embodiments of the facility collect information about purchases of each item over time, and use it to project a schedule of future purchases for each item. The facility uses these schedules, current inventory levels, and expected adjustments to inventory, such as for resupplied or returned quantities of each item, to forecast a time at which—or time period during which—inventory in each item will be exhausted. This information is then conveyed to customers of the vendor in conjunction with other information about the item conveyed to customers of the vendor. In the case of web merchants, the facility typically adds the forecasted exhaustion time to an item detail page or other web page containing information about the item. In the case of physical merchants, embodiments of the facility may display the forecasted exhaustion time on a shelf tag corresponding to the item; on other displays provided by the physical merchant that are visible to customers; and/or on portable devices carried by customers, belonging either to the physical merchant or the customers themselves.

Some embodiments of the facility operate in a distributed environment in which various computing entities of the merchant communicate using an asynchronous messaging system to coordinate their activities. Such distributed environments are described in greater detail in U.S. patent application Ser. Nos. 10/012,205 and 09/921,011.

In such distributed environments, asynchronous messaging is typically used to maintain the currency of a model of all current physical inventory possessed by the merchant. This inventory model can represent inventory at a number of different distribution centers or other locations used by the merchant to store inventory, including inventory maintained by vendors. The model further represents expected future changes to physical inventory as adjustments to the physical inventory needed to determine if inventory is available for sale. These can include complete (and, in some cases, incomplete) orders for items from customers; purchase orders expected to be received by the merchant from suppliers; and inventory transfers between distribution centers or other merchant locations.

In committing each exhaustion time update for an item to its inventory model, the facility determines whether the update changes the exhaustion time of the item. In cases where it does, the facility delivers an asynchronous message from the inventory system to a web system, which uses such messages to maintain an up-to-date model of item availability for ordering from the merchant. When a customer requests an item detail web page for a particular item from the merchant, the web system uses the item availability model to generate up-to-date characterizations of the exhaustion time forecasted for the item, which it incorporates in the requested item detail web page.

FIG. 1 is a high-level data flow diagram showing data flow within a typical arrangement of components used to provide front-end functionality of the facility. A number of web client computer systems 110 that are under user control generate and send page view requests 131 to a web system 100 via a network such as the Internet 120. These requests typically include page view requests for item detail pages and page view requests conveying item ordering instructions. Within the web system, these requests may either all be routed to a single web server computer system, or may be loaded-balanced among a number of web server computer systems.

The web system typically processes such requests using information provided by back-end components discussed below in conjunction with FIG. 2, and replies to each with a served page 132. For example, for a page view request requesting an item detail page, the served page is the requested item detail page, containing information about the availability of the item, as well as any controls for ordering the item that are consistent with the item's availability. For a page view request conveying item ordering instructions, such as those generated by the user by activating an ordering control included in an earlier-served item detail page for the same item, the served page is an order confirmation page in cases in which the page view request is sent when the item is available to order, or an order declined page indicating that the item is no longer available to order.

Figure 2:
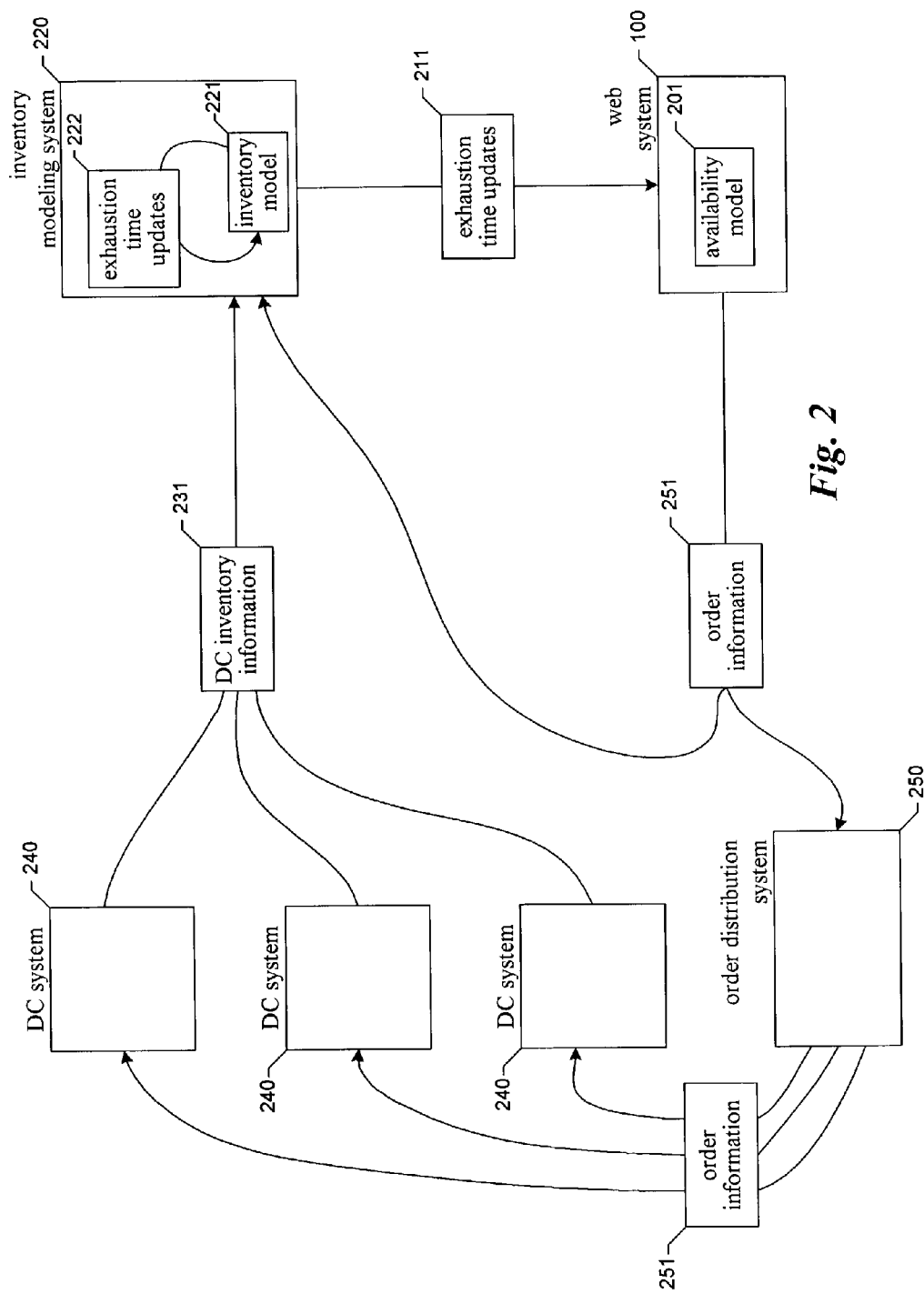
FIG. 2 is a high-level data flow diagram showing data flow within a typical arrangement of components within which the facility checks items and bundle availability.

FIG. 2 is a high-level data flow diagram showing data flow within a typical arrangement of components within which the facility checks items and bundle availability.

In general, the data flow shown and described is implemented using asynchronous messages. The web system 100 uses an item availability model 201 to process page view requests as discussed above. The item availability model models the level of availability of at least a portion of the items that may be ordered from the web merchant, including exhaustion times forecasted for at least some of the items. The item availability model is maintained by the web system using a stream of availability updates, each reflecting a change in the availability status of an item. These include exhaustion time updates 211, each updating the exhaustion times forecasted for one or more items.

Availability updates received by the web system are produced by an inventory modeling system 220, also referred to herein as the "GPI system." The inventory modeling system maintains an inventory model 221 reflecting the current inventory of each item held by each distribution center, as well as anticipated events that will affect such inventory, such as pending customer orders (expected to diminish inventory) and purchase orders scheduled to be delivered to distribution centers in the near future (expected to augment inventory), as well as order history information and forecasted exhaustion time for some items. In some embodiments, the inventory modeling system also models the inventory of some items available from vendors supplying those items. When an inventory change for an item that reflects a change in availability of the item occurs in the inventory model, the inventory modeling system sends an availability update to the web system advising the web system of the availability change of the item.

The inventory modeling system receives inventory information from a number of sources, including distribution center systems 240 that model the inventory of each distribution center; the web system, which receives orders for items from customers; and, optionally, the order distribution system (not shown). As is described in greater detail below, the inventory modeling system further updates its inventory model with bundle availability updates 222 that it generates for bundles based upon availability information it has for the items contained in those bundles.

When the web system receives an order, it generates order information 251, which contains information identifying the items ordered and the quantity of each item ordered. The web system sends the order information to an order distribution system 250 for assignment to a distribution center, as well as to the inventory modeling system. When the order distribution system receives the order information, it delegates the order to a selected one of the web merchant's distribution centers 240 for fulfillment, forwarding the order information 251 to that distribution center. In some embodiments, the order distribution system may assign orders for certain items to drop ship vendors (not shown) rather than distribution centers. The selected distribution center processes the order described in the order information, and the corresponding distribution center system 240 sends information 231 about its inventory, updated to reflect processing of the order, to the inventory modeling system. In response, the inventory modeling system updates its inventory model. The distribution center systems periodically send other distribution center inventory updates to reflect other changes to distribution center inventory, such as purchase orders placed with or received from vendors, inter-distribution center transfer shipments sent or received, etc.

Because the order information is sent to the inventory modeling system in parallel with the order distribution system, the inventory modeling system is able to adjust its inventory model to reflect the order immediately after the order is received, rather than later, after the order has been processed by the order distribution system and a distribution center.

Figure 3:
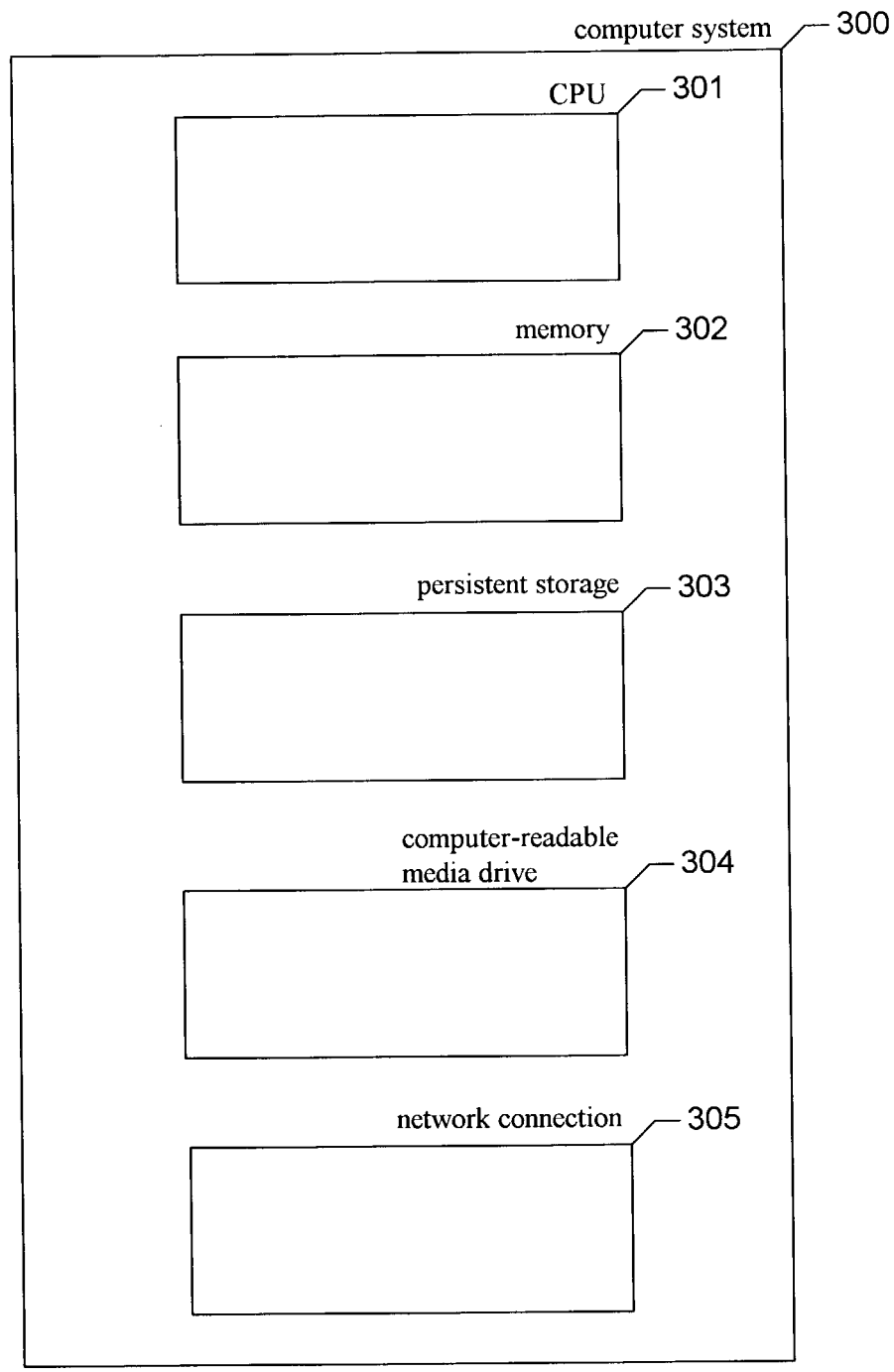
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data while they are being used; a persistent storage device 303, such as a hard drive for persistently storing programs and data; a computer-readable media drive 304, such as a CD-ROM drive, for reading programs and data stored on a computer-readable medium; and a network connection 305 for connecting the computer system to other computer systems, such as via the Internet. While computer systems configured as described above are preferably used to support the operation of the facility, those skilled in the art will appreciate that the facility may be implemented using devices of various types and configurations, and having various components.

Additional details about the facility's design, implementation, and use follow.

Figure 4:
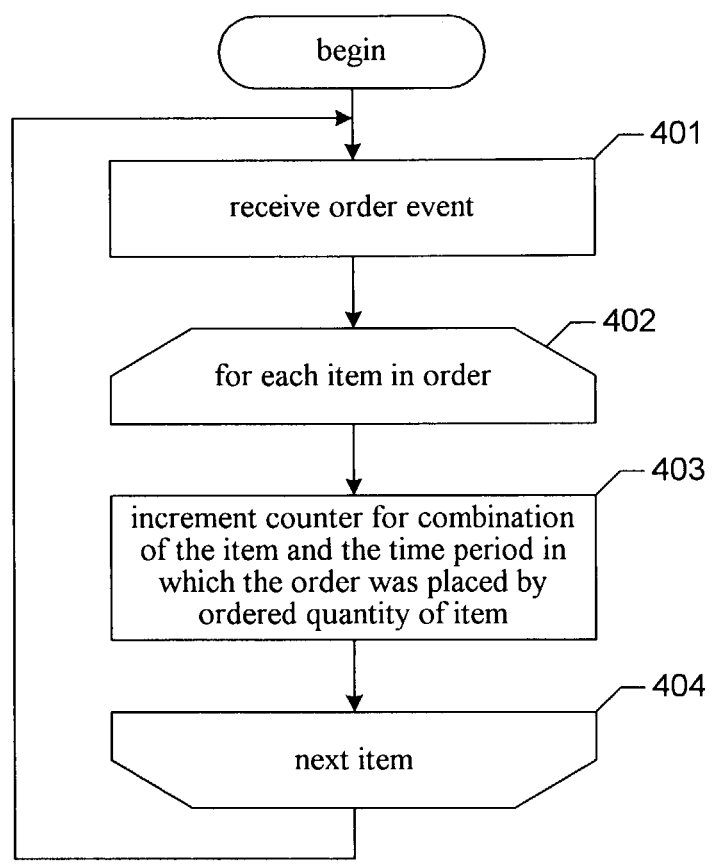
FIG. 4 is a flow diagram showing steps typically performed by the facility to collect order history information for items for use in forecasting their exhaustion dates.

FIG. 4 is a flow diagram showing steps typically performed by the facility in the inventory modeling system to collect order history information for items for use in forecasting their exhaustion dates. In step 401, the facility receives an order event containing information about a recently-placed order, including, for each of one or more items, the identifier for that item, and the quantity of that item ordered. The order event also typically indicates the time at which the order was placed. Alternatively, the order may be treated as being placed at the time the order event is received, or at another proximate time. In some embodiments, such events correspond to a point later in the purchase process than the submission of the order, such as payment or delivery. The facility repeats steps 402-404 for each different item appearing in the order. In step 403, the facility increments by the ordered quantity of the current item a counter that is maintained for the combination of the particular item and the time period in which the order was placed. In step 404, if additional items appearing in the order remain to be processed, then the facility continues at step 402 to process the next item in the order, else the facility continues in step 401 to receive the next order event.

Figure 5:
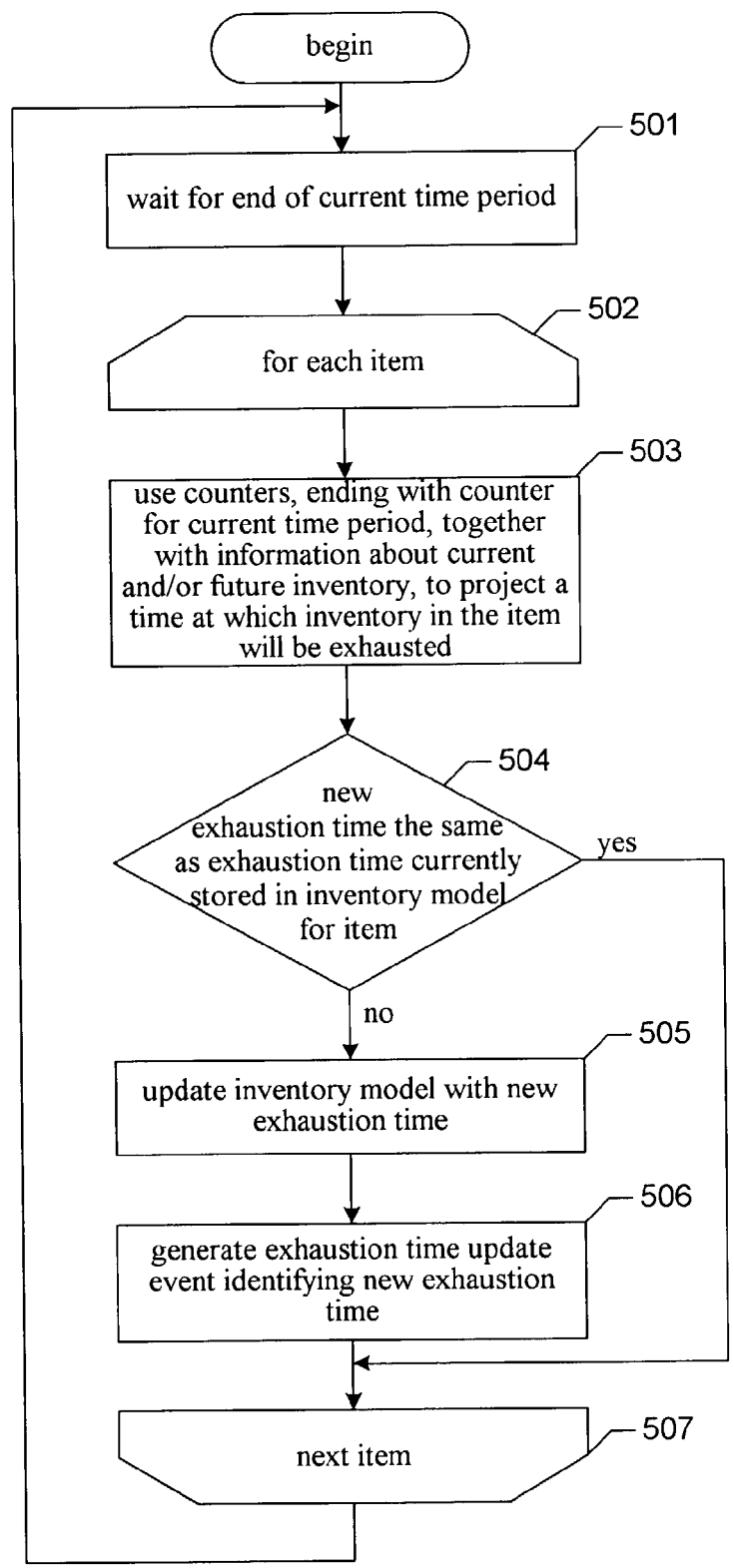
FIG. 5 is a flow diagram showing steps typically performed by the facility to forecast exhaustion times for items being sold by the merchant.

FIG. 5 is a flow diagram showing steps typically performed by the facility in the inventory modeling system to forecast exhaustion times for items being sold by the merchant. In step 501, the facility waits for the end of the current time period, such as the end of the current hour. The facility then repeats steps 502-507 for each item for which an exhaustion time is to be forecasted, which may be the entire set of items available from the merchant or proper subset thereof. In step 503, the facility uses a vector of counters, ending with the counter for the current time period, together with information about current and/or future inventory, to project a time at which inventory in the item will be exhausted.

In different embodiments, the facility uses different approaches to project exhaustion times in step 503. In one embodiment, the facility uses a simple average technique in which the facility determines the average of past nonzero values, and that same average is projected for each future time period. In another embodiment, the facility uses a linear modeling technique, in which a straight line is fitted to past nonzero values and extended to project values for future time periods. Additional embodiments use techniques such as the following: Box-Jenkins approach (ARIMA); auto-correlation; exponential smoothing; year-over-year; seasonal decomposition; or pick-best in which different techniques are tried, and the technique that predicted best in the recent past is selected. These and other appropriate statistical techniques are well-known among those skilled in the art, and are described in Box et al., "Time Series Analysis: Forecasting & Control," Prentice Hall, $3^{rd}$ Edition, Feb. 28, 1994; Brockwell et al., "Introduction to Time Series and Forecasting," Springer Verlag, $2^{nd}$ Book Edition, Mar. 8, 2002; Hamilton, James D., "Time Series Analysis," Princeton University Press, Jan. 11, 1994; Fuller, Wayne A., "Introduction to Statistical Time Series;" John Wiley & Sons, $2^{nd}$ Edition, December 1995; and, Arsham, Hossein, "Time Series Analysis and Forecasting Techniques," Feb. 18, 1994, http://www.ubmail.ubalt-.edu/~harsham/stat-data/opre330Forecast.htm, each of which is hereby incorporated by reference in its entirety. One of ordinary skill in the art will appreciate that the facility may also employ a variety of other additional statistical techniques.

In step 504, if the new exhaustion time projected in step 503 is the same as exhaustion time currently stored in the inventory model for the item, then the facility continues in step 507, else the facility continues in step 505. In step 505, the facility updates the inventory model with the new exhaustion time projected in step 503. In step 506, the facility generates an exhaustion time update event for receipt by the web system that identifies this new exhaustion time. In step 507, if additional items remain to be processed, then the facility continues in step 502 to process the next of these items, else the facility continues in step 501 to wait for the end of the next current time period.

Figure 6:
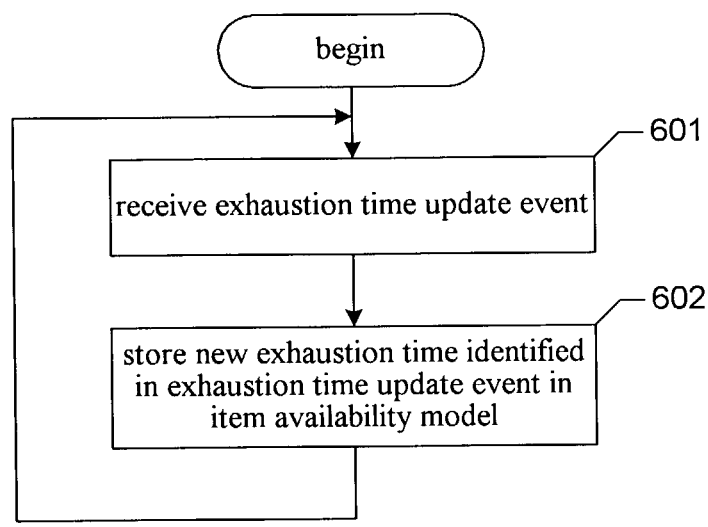
FIG. 6 is a flow diagram showing steps typically performed by the facility to update its availability model with newly-projected exhaustion times.

FIG. 6 is a flow diagram showing steps typically performed by the facility in the web system to update its availability model with newly-projected exhaustion times. In step 601, the facility receives an exhaustion time update event from the inventory modeling system. In step 602, the facility stores the new exhaustion time identified in the exhaustion time update event received in step 601 in the item availability model. After step 602, the facility continues in step 601 to receive the next exhaustion time update event.

Figure 7:
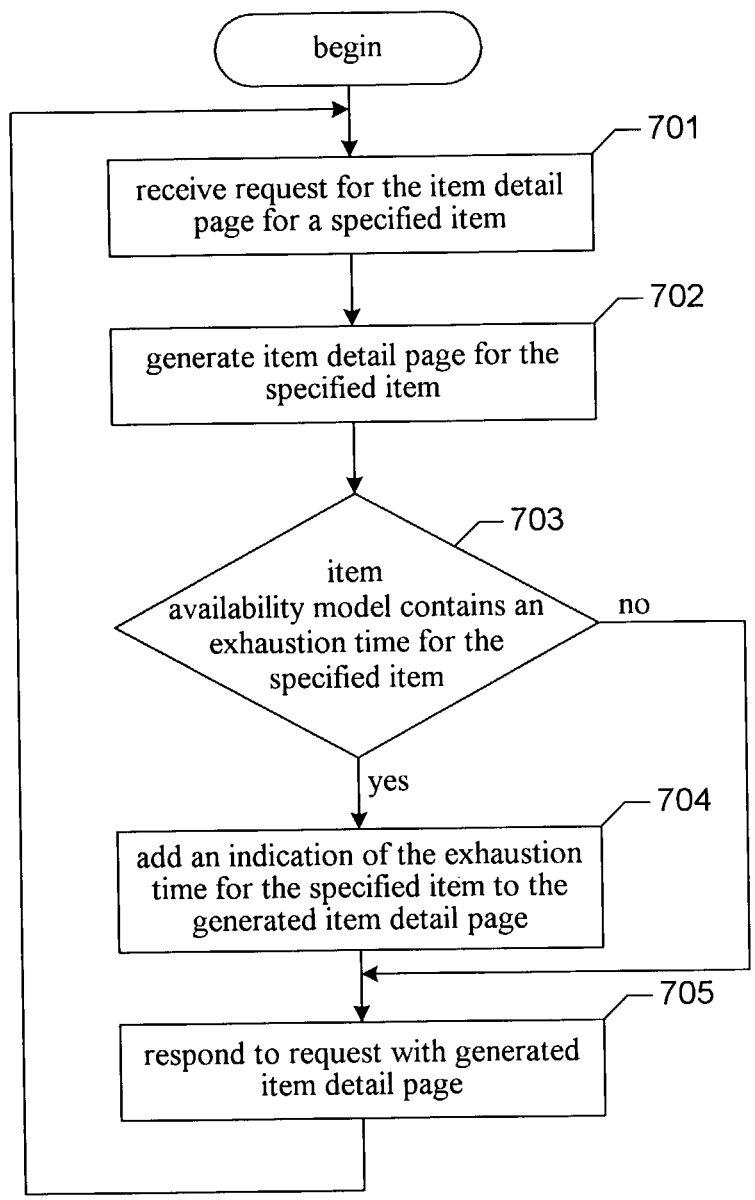
FIG. 7 is a flow diagram showing steps typically performed by the facility to incorporate exhaustion time information in information distributed to customers of the merchant.

FIG. 7 is a flow diagram showing steps typically performed by the facility in the web system to incorporate exhaustion time information in information distributed to customers of the merchant. In step 701, the facility receives a request for the item detail page for a specified item. In step 702, the facility generates an item detail page for the specified item. In step 703, if the item availability model contains an exhaustion time for the specified time, then the facility continues in step 704, else the facility continues in step 705. In some embodiments, the test of step 703 further tests whether exhaustion time for the specified item contained by the availability model occurs before a configurable cutoff time, such as two weeks in the future. In step 704, the facility adds an indication of the exhaustion time for the specified item to the generated item detail page. In step 705, the facility responds to the request received in step 701 with the generated item detail page. After step 705, the facility continues in step 701 to receive the next item detail page request.

The following examples help to illustrate the maintenance of an exhaustion date for a sample item, and the use of this exhaustion date in information provided to customers about the sample item.

In the first example, the merchant has 1000 units that it obtained at a special price. The merchant expects to sell these units, but not replenish them. An entry is created for this item in the inventory model as shown below in Table 1.

TABLE 1

Item 123
GlobalReservations = 0;

TABLE 1-continued

ReplenishmentStrategy = DNR (Do not replenish)
ExhaustionDate = 0;
SEA1
   InInventory = 1000;

It can be seen that each such inventory model entry identifies the number of the item to which it pertains; the quantity of the item that is reserved for orders that have been placed, but not yet assigned to a particular distribution center ("GlobalReservations"); a replenishment strategy indicating how the item is to be replenished; the date on which exhaustion of inventory in the item is forecasted; and inventory statuses for each of one or more distribution centers. Possible values for replenishment strategies are as follows: DNR—do not replenish; DNS—the merchant sells this item, but does not stock in any of its distribution centers; AUTOMATIC—the item is automatically ordered from vendors, enabling it to be sold even when not in stock at the distribution centers; MANUAL—replenished using manual processes; VIRTUAL—items with which no physical stock is associated, always in inventory (e.g., an electronic book); DERIVED—inventory in this item is derived from inventory in other items (e.g., bundle items); UNKNOWN—replenishment strategy is not known, and assumed for most purposes to be AUTOMATIC.

For example, it can be seen from the contents of Table 1 that no unassigned orders have been placed for item 123; its inventory will not be replenished once exhausted; no exhaustion date has been forecasted, as no historical sales data has yet been collected; and a Seattle distribution center ("SEA1") has a quantity of 1000 in inventory.

The item goes on sale at Noon on January 1. At that point, the web system displays language such as "In Stock" or "In stock—1000 units available."

As the web system takes orders, it publishes order creation messages. A daemon subscribes to these messages and builds a histogram of order activity, such as in a database. In one example, this histogram has one-hour granularity buckets for recent history, and one-day granularity buckets for less recent history.

After one hour, the merchant has taken 10 orders, and the histogram is as shown below in Table 2.

TABLE 2

10 0 0 0 0 0 0 0 0 0 0 . . .

Restrospective histograms, such as the one shown in Table 2, are shown herein with the counter for the most recent time period at the left end, and the counters for increasingly earlier time periods extending toward the right.

At the end of the first hour, the facility determines from the histogram that the run-rate for this item is 10 units per hour for the last hour, and no units before this. Because one hour of data is not enough to reliably predict an exhaustion date, the facility does nothing.

After two hours, the merchant has taken 19 orders, and the histogram is as shown below in Table 3.

TABLE 3

9 10 0 0 0 0 0 0 0 0 . . .

At the end of the second hour, using a linear interpolation technique, the facility identifies a trend in this histogram. It calculates a run rate of 9.5 units per hour, and determines from the inventory model that 981 units remain. It computes a projected run rate in the future of 9.5 with no change. It divides the remaining inventory (981) by 9.5, yielding a remaining time to stock out of 103 hours. This converts to four days and 7 hours. The facility then updates the inventory model with the new exhaustion date as shown below in Table 4.

TABLE 4

Item 123
GlobalReservations = 0;
ReplenishmentStrategy = DNR (Do not replenish)
ExhaustionDate = Jan 5 - 17:00
SEA1
   InInventory = 981;

At this point, the website would not change its messaging, as four days is an exhaustion time too far in the future.

After several hours, at Noon of January 2, when there are 600 units remaining to be sold, the histogram is as shown below in Table 5.

TABLE 5

30 25 22 20 18 17 15 14 16 18 10 12 15 15 17 18 14 13 17 13 . . .

At this point, the facility re-projects the run rate as shown below in Table 6.

TABLE 6

35 40 45 50 55 60 65 70 75 80 90 90 90 90 90 90 90 90 90

Prospective histograms, such as the one shown in Table 6, are shown herein with the counter for the earliest future time period in the left end, and the counters for increasingly later time periods extending toward the right.

The facility computes that inventory on the sample item will be exhausted in approximately 5 hours and 15 minutes, and updates the inventory model as shown below in Table 7.

TABLE 7

Item 123
GlobalReservations = 0;
ReplenishmentStrategy = DNR (Do not replenish)
ExhaustionDate = Jan 2 - 17:15
SEA1
   InInventory = 600;

As this time is less than a day, the website availability message would change language such as: "Limited Inventory—based on sales history, we expect to be out of stock on this item in 24 hours or less."

The first example, described above, illustrates the operation of the facility with respect to an item in which inventory will be permanently exhausted, as the item has a replenishment strategy of DNR and will therefore not be replenished. As discussed in a second example below, the facility may also be used to identify instances of temporary inventory exhaustion for items that have a positive replenishment strategy, such as AUTOMATIC or MANUAL.

In order to identify temporary exhaustion dates, the facility typically uses one or both of the following configurable parameters, which may be configured in a way that best serves the merchant's business objectives: (1) the amount of time that the merchant will be without inventory in an item for it to be considered temporarily exhausted ("cut off time"), and (2) whether vendor inventory is to be considered in identifying temporary exhaustion dates. In each of the cases discussed below as part of the second example, values for these two parameters are specified, and a constant run rate of 10 units per hour is attributed to the item. Those of ordinary skill in the art will recognize that the facility may also use the techniques described above to identify temporary exhaustion dates where non-constant future order rates are projected. Also, in the second example, all inventory in the network is considered to be combined into a single logical distribution center.

Case 1—Cut off time=2 days, ignore vendor inventory.
Subcase 1a
In Inventory=40
vendor availability in 1 week.

At the constant run rate of 10 units per hour, the current inventory of 40 units will run out in 4 hours. As there is no more available inventory (ignoring vendors), the facility identifies a temporary exhaustion date 4 hours from now.

Subcase 1b
In Inventory=40
PO with 1000 arriving in 1 day.
vendor availability of 1 week.

At the constant run rate of 10 units per hour, the current inventory of 40 units will run out in 4 hours. However, before (4 hours+2 days), more inventory will arrive. The facility therefore adds the number of arriving units to the number of units in inventory, and divides by the run rate yielding an anticipated temporary exhaustion date of 1004 hours from now.

Subcase 1b
In Inventory=40
PO with 100 arriving in 1 day
PO with 1000 arriving in 3 day.
vendor availability of 1 week.

At the constant run rate of 10 units per hour, the current inventory of 40 units will run out in 4 hours. As above, this gets supplemented by the first purchase order. Using the first purchase order, the facility computes an out of stock time of 14 hours from now. The facility then determines that the next inventory is more than 2 days from that stock out time, so the facility identifies a temporary exhaustion date of 14 hours from now.

Subcase 1d
In Inventory=40
PO with 250 arriving in 1 day
PO with 1000 arriving in 3 day.
Vendor availability of 1 week.

At the constant run rate of 10 units per hour, the current inventory of 40 units will run out in 4 hours. This gets supplemented by the first purchase order, yielding stock out time of 29 hours from now. Because the inventory arriving in 3 days falls within (29 hours+2 days), the facility we adds that inventory arriving in 3 days into the available pool of inventory, yielding an estimated exhaustion date 129 hours from now.

Case 2: Cut off time=1 day. Use Vendors
Subcase 2a
In Inventory=40
vendor with infinite supply at 1 day;

No stock out is expected to occur, as the vendor is believed to have enough to supply any projected orders. Accordingly, no temporary exhaustion date is identified.

Subcase 2b
In Inventory=40
vendor with supply of 1000 units at 1 day.
vendor with supply at 4 weeks.

The facility identifies an initial stock out date 4 hours from now. The facility determines that the first vendor can help the merchant avoid the cliff, but only has 1000 units. This moves the stock out date to 104 hours from now. The facility determines that the second vendor falls beyond 104 hours+2 days, so the facility does not consider inventory from the second vendor. The facility therefore identifies a temporary estimated exhaustion date at 104 hours from now.

It will be appreciated by those skilled in the art that the above-described facility may be straightforwardly adapted or extended in various ways. For example, various sources of information about anticipated future inventory levels may be used by the facility, as may various different kinds of numerical methods for projecting future orders. While the foregoing description makes reference to preferred embodiments, the scope of the invention is defined solely by the claims that follow and the elements recited therein.

I claim:

1. A method in a computing system for analyzing ordering trends for an item offered by a merchant holding inventory in the item, comprising:
performing by one or more computers:
providing an inventory model that includes a stored representation of respective inventory levels of different items offered by the merchant and, for each of those items, a respective inventory exhaustion time at which inventory in that item is expected to become depleted;
determining a first depletion time that specifies when future ordering activity is expected to deplete the merchant's inventory in a particular item;
receiving a configurable parameter that specifies a period of time during which inventory in the particular item is permitted to be temporarily exhausted, said period of time ending after the first depletion time;
in response to determining that the merchant's inventory in the particular item is expected to be replenished by additional inventory after the first depletion time and prior to the end of the configurable parameter's specified period of time during which inventory in the particular item is permitted to be temporarily exhausted:
eliminating said first depletion time from consideration for inclusion within the inventory model; and
selecting for inclusion within the inventory model, a new inventory exhaustion time that is dependent on when the additional inventory is expected to be depleted by future ordering activity; and
in accordance with said selection and said elimination, updating the respective inventory exhaustion time of the particular item within the inventory model to the new inventory exhaustion time without updating the respective inventory exhaustion time to said first depletion time.

2. The method of claim 1 wherein the selected inventory exhaustion time is absolute.

3. The method of claim 1 wherein the selected inventory exhaustion time is a relative time based on when that time is to be displayed as part of an item detail page.

4. The method of claim 1 wherein the method comprises performing a comparison of future ordering activity projected for the item to current physical inventory in the item, wherein the determination of the first depletion time is dependent on said comparison.

5. The method of claim 1 wherein the method comprises performing a comparison of future ordering activity projected for the item to a combination of current physical inventory in the item with one or more instances of anticipated future replenishment of the item, wherein the determination of the selected inventory exhaustion time is dependent on said comparison.

6. The method of claim 4, wherein the method comprises projecting the future ordering activity, wherein the future ordering activity projected for the particular item identifies, for each of a plurality of upcoming periods of time, the number of units of the particular item expected to be ordered during the upcoming period of time.

7. The method of claim 6 wherein the comparison involves, for each of the plurality of upcoming periods of time, in earliest-to-latest order,
calculating an expected physical inventory in the particular item at the end of the upcoming period of time by subtracting the number of units of the particular item expected to be ordered during the upcoming period of time from the expected physical inventory in the particular item at the beginning of the upcoming period of time, until the expected physical inventory in the particular item at the end of that upcoming period of time is less than one unit, and wherein it is determined that future ordering activity is expected to exhaust inventory in the particular item during that upcoming period of time.

8. The method of claim 6 wherein the comparison involves, for each of the plurality of upcoming periods of time, in earliest-to-latest order,
calculating an expected physical inventory in the particular item at the end of the upcoming period of time by subtracting the number of units of the particular item expected to be ordered during the upcoming period of time from the expected physical inventory in the particular item at the beginning of the upcoming period of time and adding the number of units of the particular item expected to be received during the upcoming period of time, until the expected physical inventory in the particular item at the end of that upcoming period of time is less than one unit, and wherein it is determined that future ordering activity is expected to exhaust inventory in the particular item during that upcoming period of time.

9. The method of claim 6 wherein projecting the future ordering activity is based on an ordering history for the particular item, wherein the ordering history identifies, for each of a plurality of foregoing periods of time, the number of units of the particular item ordered during the foregoing period of time.

10. The method of claim 9 wherein the plurality of foregoing periods of time each comprise a uniform selected quantity of time, and wherein the determination is made no more than the selected quantity of time after the end of the most recent foregoing period of time identified by the ordering history.

11. The method of claim 1, wherein the method comprises projecting the future ordering activity, wherein the future ordering activity is projected by applying linear modeling to historical ordering activity for the particular item.

12. A computer-readable medium storing contents that cause a computing system to analyze ordering of an item offered by a merchant holding inventory in the item, wherein said contents are executable by the computing system to perform:
providing an inventory model that includes a stored representation of respective inventory levels of different items offered by the merchant and, for each of those items, a respective inventory exhaustion time at which inventory in that item is expected to become depleted;
selecting a first depletion time that specifies when future ordering activity is expected to deplete the merchant's inventory in a particular item;
receiving a configurable parameter that specifies a period of time during which inventory in the particular item is permitted to be temporarily exhausted, said period of time ending after the first depletion time;
in response to determining that the merchant's inventory in the particular item is expected to be replenished by additional inventory after the first depletion time and prior to the end of the configurable parameter's specified period of time during which inventory in the particular item is permitted to be temporarily exhausted:
eliminate said first depletion time from consideration for inclusion within the inventory model; and
select for inclusion within the inventory model, a new inventory exhaustion time that is dependent on when the additional inventory is expected to be depleted by future ordering activity; and
in accordance with said selection and said elimination, updating the respective inventory exhaustion time of the particular item within the inventory model to the new inventory exhaustion time without updating the respective inventory exhaustion time to said first depletion time.

13. A computing system for analyzing ordering trends for an item offered by a merchant, the system comprising:
an inventory modeling subsystem comprising an inventory model that includes a stored representation of respective inventory levels of different items offered by the merchant and, for each of those items, a respective inventory exhaustion time at which inventory in that item is expected to become depleted;
a first subsystem configured to determine a first depletion time that specifies when future ordering activity is expected to deplete the merchant's inventory in a particular item;
a second subsystem configured to receive a configurable parameter that specifies a period of time during which inventory in the particular item is permitted to be temporarily exhausted, said period of time ending after the first depletion time;
third subsystem configured to, in response to determining that the merchant's inventory in the particular item is expected to be replenished by additional inventory after the first depletion time and prior to the end of the configurable parameter's specified period of time during which inventory in the particular item is permitted to be temporarily exhausted:
eliminate said first depletion time from consideration for inclusion within the inventory model; and
select for inclusion within the inventory model, a new inventory exhaustion time that is dependent on when the additional inventory is expected to be depleted by future ordering activity; and
a fourth subsystem configured to, in accordance with said selection and said elimination, update the respective inventory exhaustion time of the particular item within the inventory model to the new inventory exhaustion time without updating the respective inventory exhaustion time to said first depletion time.

14. The method of claim 1 wherein the method comprises inserting the new inventory exhaustion time within an item detail page that contains a control that can be activated to order the item against the inventory prior to but not after the new inventory exhaustion time of the item detail page.

15. The computer-readable medium of claim 12 wherein the contents are configured to insert the new inventory exhaustion time within an item detail page that contains a control that can be activated to order the item against the inventory prior to but not after the new inventory exhaustion time of the item detail page.

16. The computing system of claim 13 wherein the system is configured to insert the new inventory exhaustion time within an item detail page that contains a control that can be activated to order the item against the inventory prior to but not after the new inventory exhaustion time of the item detail page.

\* \* \* \* \*